United States Patent
Ullman

Patent Number: 5,746,029
Date of Patent: May 5, 1998

[54] TILE ROOF STRUCTURE FOR SUPPORTING A HEAVY LOAD WITHOUT DAMAGE TO THE TILE

[76] Inventor: Stanley A. Ullman, 4630 Calle Quetzal, Camarillo, Calif. 93012

[21] Appl. No.: 752,568

[22] Filed: Nov. 21, 1996

Related U.S. Application Data

[60] Provisional application No. 60/008,359 Dec. 7, 1995.

[51] Int. Cl.$^6$ ....................................................... E04G 3/08
[52] U.S. Cl. .................... 52/27; 52/703; 52/706; 52/710; 52/745.17; 248/237; 403/384; 403/388
[58] Field of Search ....................... 52/27, 553, 703, 52/704, 706, 707, 710, 715, 745.17; 248/237; 403/384, 386, 388, 389

[56] References Cited

U.S. PATENT DOCUMENTS

| | | | |
|---|---|---|---|
| 1,922,479 | 8/1933 | Joslin | 51/704 X |
| 2,937,690 | 5/1960 | Hedstrom | 403/389 X |
| 3,269,679 | 8/1966 | Grappo | 248/237 X |
| 3,332,186 | 7/1967 | Cammaert | 52/551 X |
| 4,371,139 | 2/1983 | Clark | 248/237 |
| 4,596,102 | 6/1986 | Catani et al. | 52/710 X |
| 4,605,333 | 8/1986 | Hovland et al. | 248/237 X |
| 4,799,642 | 1/1989 | Wright | 248/237 X |
| 4,831,796 | 5/1989 | Ladduwahetty | 52/704 X |
| 5,370,202 | 12/1994 | Nichols | 248/237 X |
| 5,617,680 | 4/1997 | Beatty | 52/27 |

*Primary Examiner*—Carl D. Friedman
*Assistant Examiner*—Laura A. Callo
*Attorney, Agent, or Firm*—Ralph D. Chabot; Gene W. Arant; Christopher Balzan

[57] ABSTRACT

An apparatus for supporting a heavy load above a tile roof without causing damage to tile members, comprising: an elongated base member adapted to lie upon the surface of the roof underneath a tile member; a lag bolt for securing the the base member to a rafter in the roof; a slidable carriage having a threaded hole therethrough, the carriage slidably engaging the base member; a threaded elongated shaft capable of being inserted through a hole in the tile member and into threaded engagement with the carriage so that the end of the shaft may be caused to engage the base member and thereby fixedly secure the shaft; and a means associated with the shaft for attaching a heavy load.

25 Claims, 8 Drawing Sheets

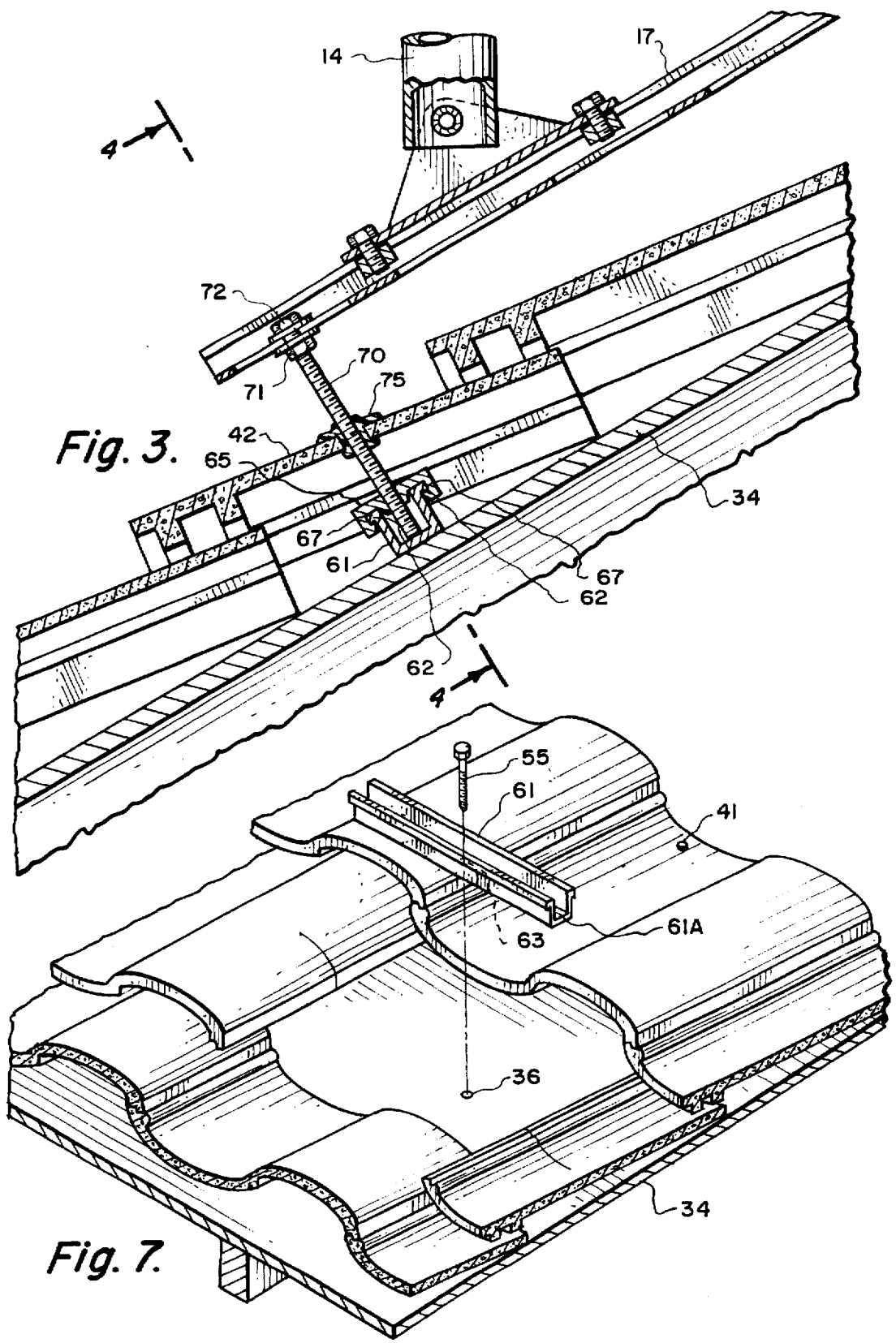

TILE ROOF STRUCTURE FOR SUPPORTING A HEAVY LOAD WITHOUT DAMAGE TO THE TILE

BENEFIT OF PROVISIONAL APPLICATION FILING DATE

This application claims the benefit of my provisional patent patent application Ser. No. 60/008,359 filed Dec. 7, 1995.

BACKGROUND OF THE INVENTION

Satellite dishes and solar panels are heavy structures that often need to be supported upon a roof. Where the roof is covered with tile this presents a difficult problem, because not only must the roof support the added weight of the additional structure against wind and other disturbances, but damage to the tile must also be avoided. Damage to the tile would cause the roof to leak.

Generally speaking, such structures are added subsequent to the original construction of the roof. In making an installation after the roof is already completed, not only is it desirable to provide proper support for the additional structure without damage to the tile, but there also needs to be a feasible retrofitting process that is reliable and easy to use.

SUMMARY OF THE INVENTION

According to the present invention a metal structure is provided for placement upon a tile-covered roof underneath a particular tile member so as to support a heavy load above the tile but without damage to the tile.

Further in accordance with the invention, a feasible method is provided for retrofitting the added structure to an existing roof.

In accordance with the invention a metal structure includes a generally Z-shaped frame that has a mid-portion which extends horizontally upon the roof, a lower end portion which extends downward through the roof, and an upper end portion which passes vertically upward through an opening in a selected tile member. The horizontal distance between the attachments of the upper and lower end portions to the mid-portion of the frame is adjustable in order to provide a feasible and convenient method of retrofitting to an existing roof.

Further in accordance with the invention, all portions of the metal frame provide support against vertical movement either up or down, as well as against side shear forces. This is very important because either a solar panel or a satellite dish antenna may encounter a strong wind force that could pull it off the roof if it were not securely anchored.

DRAWING SUMMARY

FIG. 3 is a vertical cross-sectional view taken on the line 3—3 of FIG. 1;

FIGS. 5 through 16 show the successive steps in retrofitting the structure onto an existing tile roof in accordance with the method provided by my invention.

DESCRIPTION OF PREFERRED EMBODIMENT (FIGS. 1–16)

Figure 1:
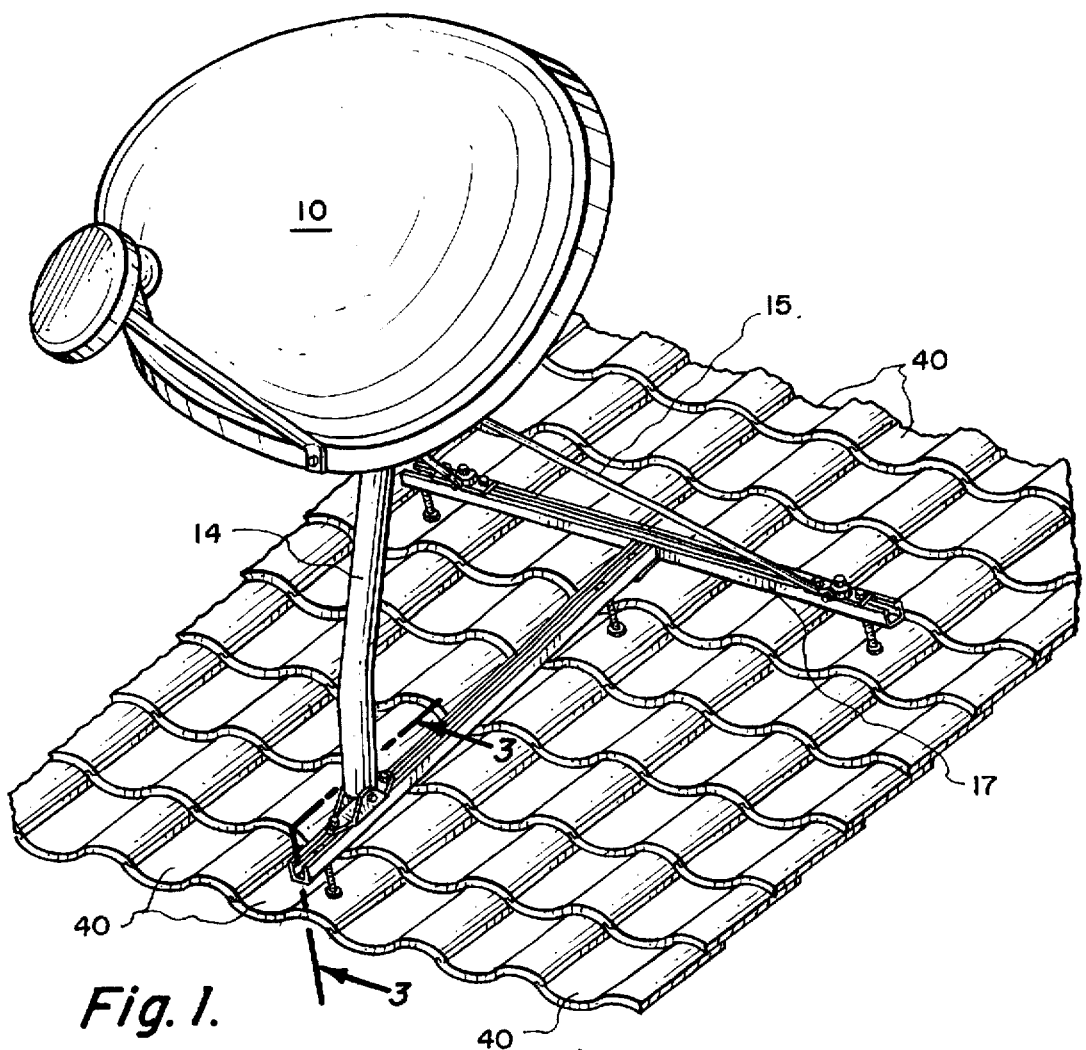
FIG. 1 is a perspective view of a satellite dish antenna supported above a tile roof in accordance with the presently preferred form of my invention.
Figure 2:
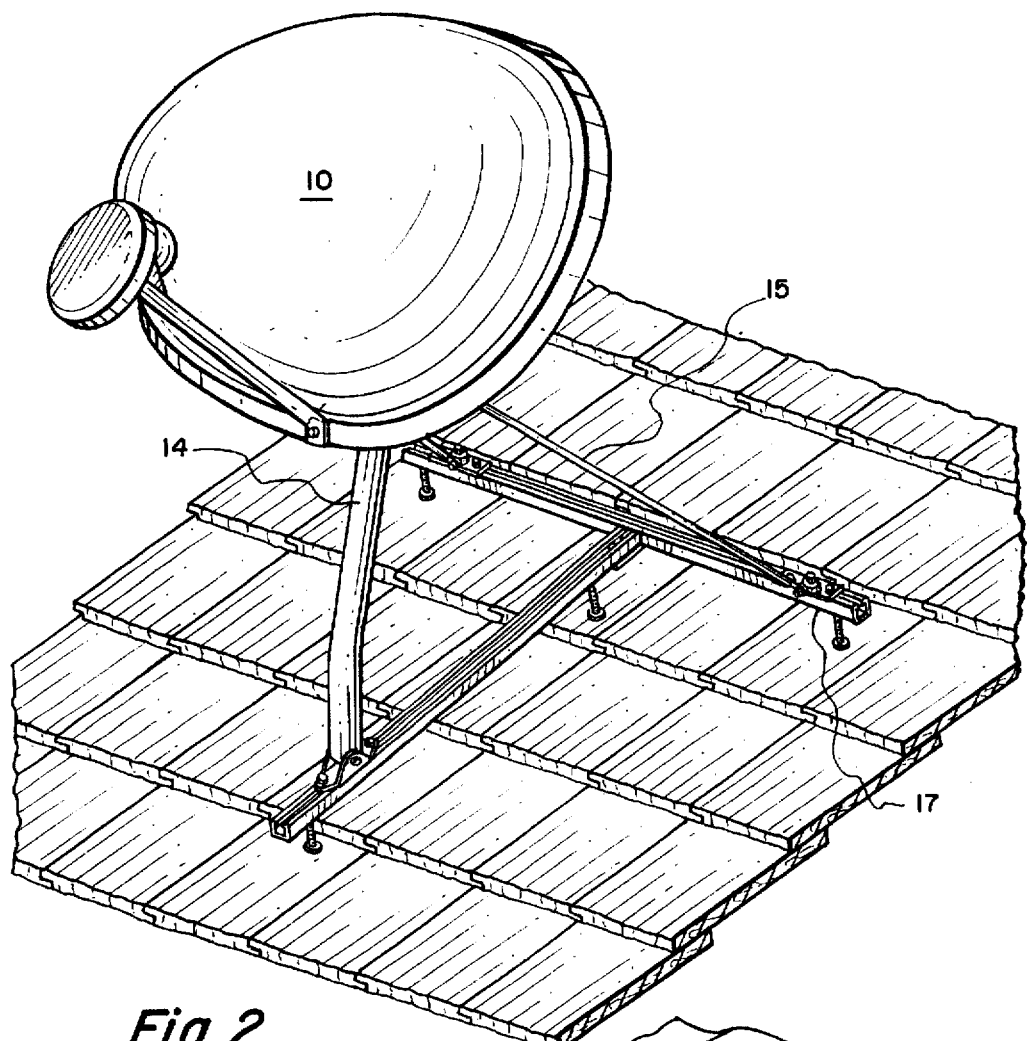
FIG. 2 shows an installation above another kind of tile.

According to the invention a satellite antenna dish 10 as shown in FIGS. 1 and 2 is supported upon a frame 17 having legs 14, 15, and 16. These legs in turn rest upon a T-shaped base of frame 17 which is supported from the roof at four separate points, each point of support being achieved in accordance with the method and apparatus of the present invention. With standard construction the roof includes a plurality of rafters that are arranged generally in parallel at an angle inclined to the horizontal, although only one such rafter 32 is shown in drawing FIGS. 4–8. A wooden roof plate or sheeting 34 best shown in FIGS. 3–8, is supported upon the rafters.

Figure 4:
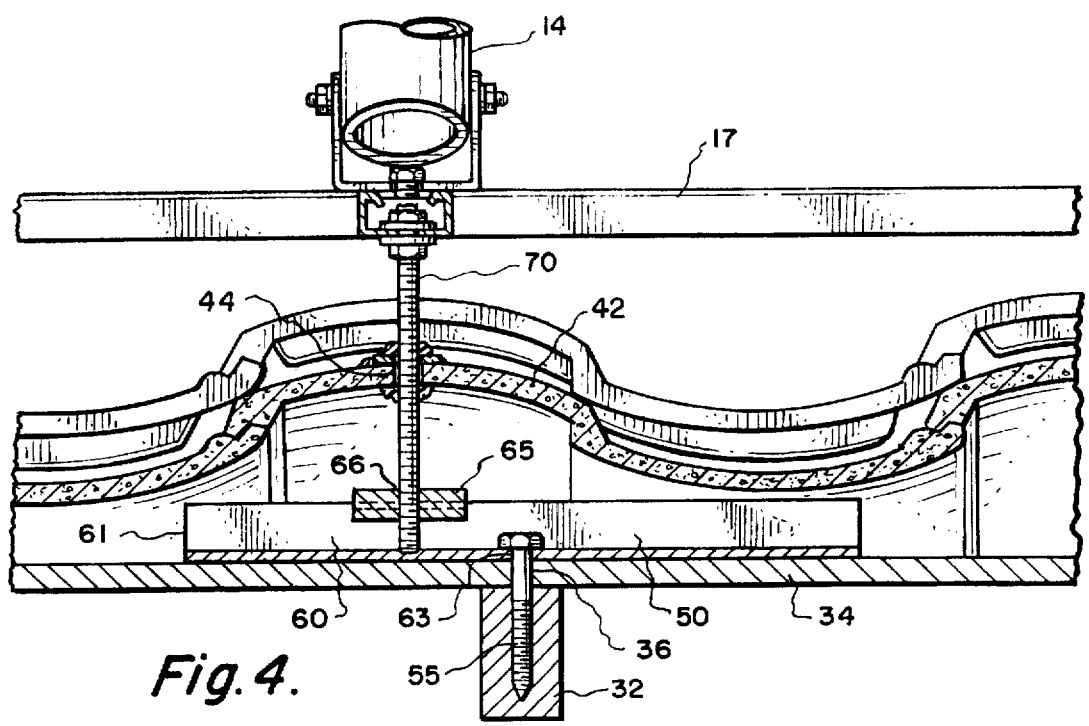
FIG. 4 is a vertical cross-sectional view taken on the line 4—4 of FIG. 3.

FIGS. 3 and 4 show a structure completed in accordance with the present invention, with the tiles being of the type shown in FIG. 1. A particular rafter that has been selected to support leg 14 of frame 17 is designated by numeral 32 best shown in FIG. 4. The wooden roof plate or sheeting 34 is supported upon the selected rafter 32, and a lag bolt 55 extends through the sheeting and into the rafter 32.

Figure 5:
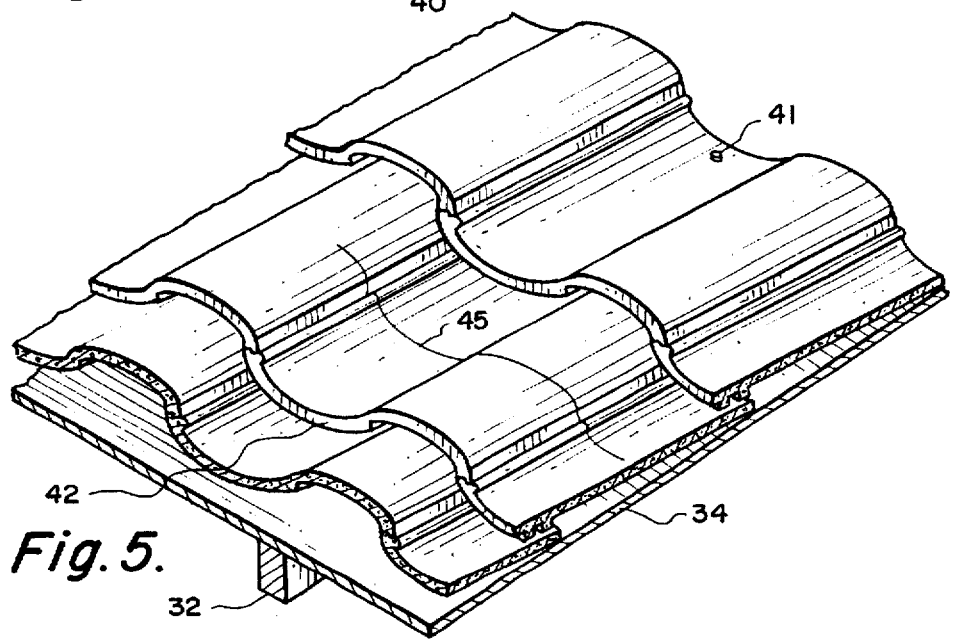
Figure 6:
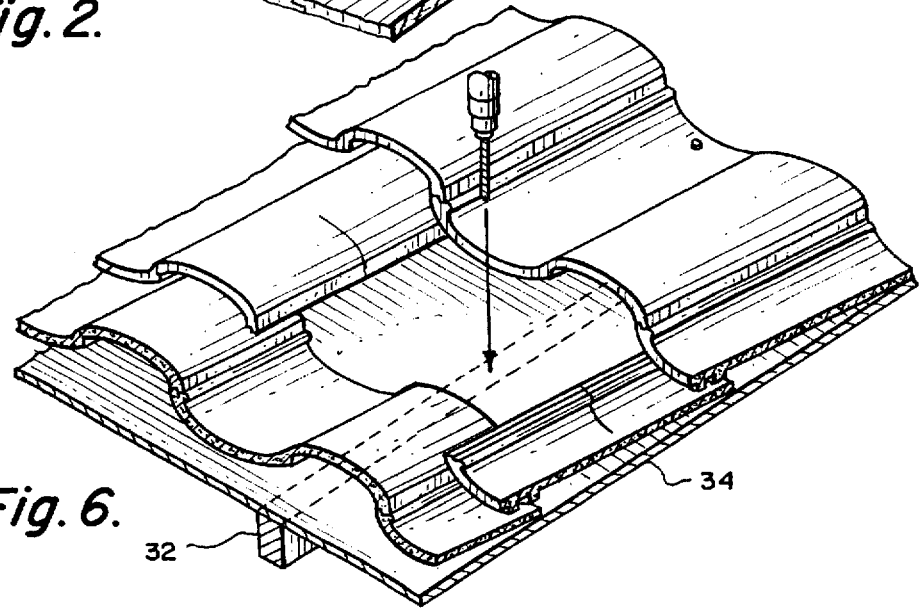
Figure 10:
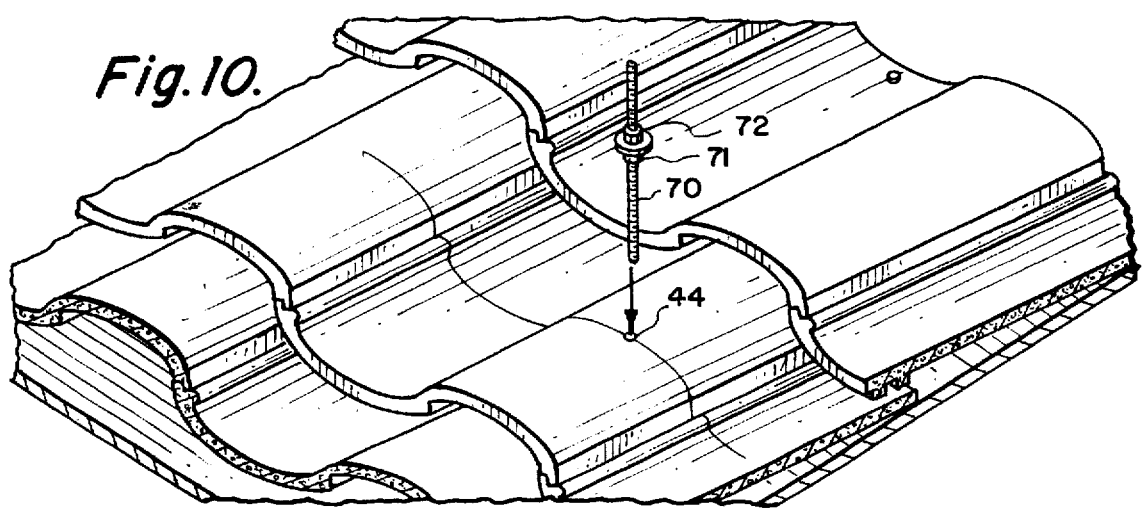

Also in accordance with standard practice a plurality of identical tiles 40 are supported upon the roof best shown in FIG. 1. Each tile has its upper end portion secured to the sheeting 34 by a nail 41 as shown in FIG. 5. A selected tile 42 shown in FIG. 5 was removed as shown in FIG. 6, for accomplishing the retrofit process of the invention, and an opening 44 as is shown in FIG. 10, was made in that selected tile.

Turning to FIG. 4, the novel apparatus of the invention includes a generally Z-shaped frame 50 having a mid-portion 60, a lower end portion that is provided by the lag bolt 55, and an upper end portion that is provided by a threaded shaft 70. The mid-portion 60 of the frame 50 includes a channel-shaped member or elongated base member 61 and a carriage 65 that is slidable longitudinally of the channel member. As shown in FIG. 3, channel member 61 has outwardly extending flanges 62 on the upper part of its outer walls, and the carriage 65 has flanges 67 that pass underneath the flanges of the channel member. This relationship is part of the total arrangement of the structure that supports both compression forces and tensile forces imposed by the dish 10 or other load.

Figure 8:
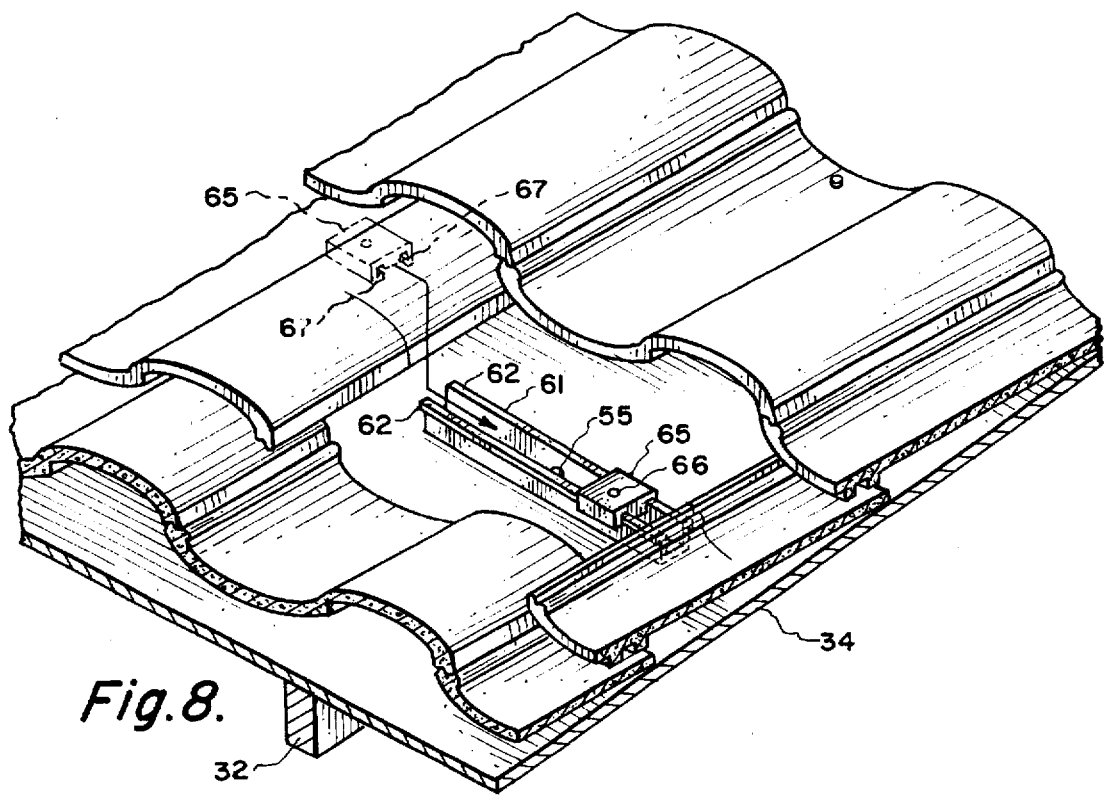
Figure 9:
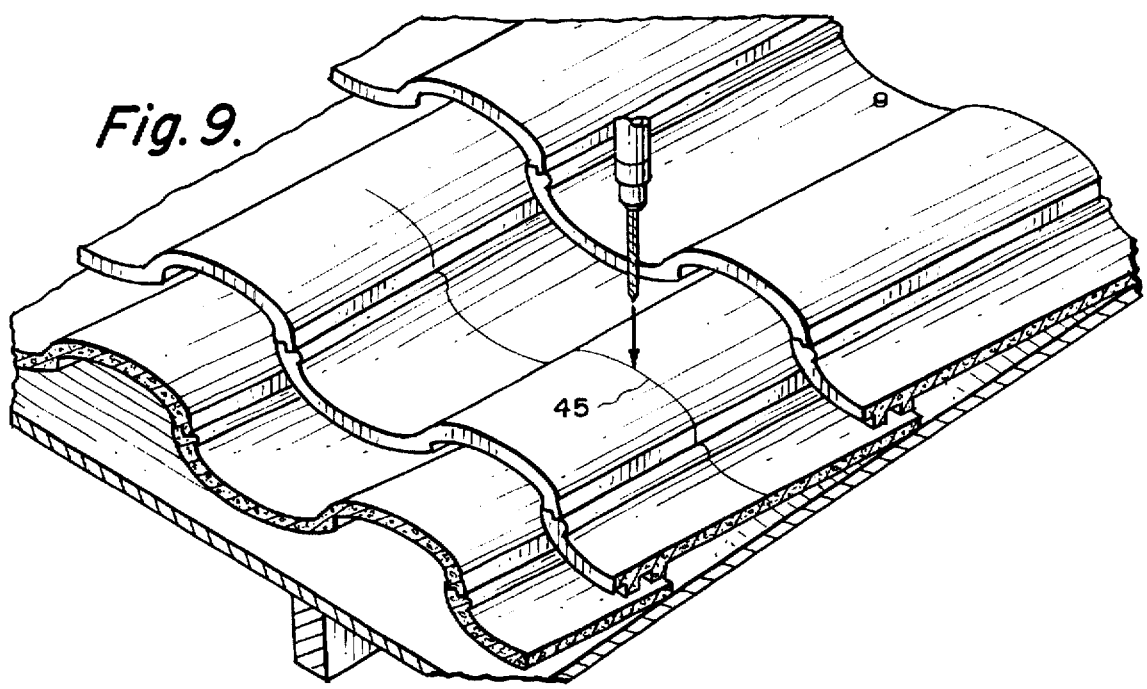

Turning to FIG. 7, there is a hole 63 in the bottom wall 61A of the channel-shaped member 61, through which the lag bolt 55 passes and provides a means for attaching the channel shaped member or base member 61 to the roof. This hole is made preferably near the longitudinal center of the channel member 61, in order to provide best support upon the sheeting or roof plate 34. In the installation process, a small hole 36 would be drilled through the roof plate 34 before the lag bolt is installed. By installation of the lag bolt as shown in FIG. 8, the longitudinal position of the channel member 61 relative to the roof is established, but the relative position of carriage 65 is still adjustable.

Turning to FIG. 4, threaded bolt 70 performs two functions. One is to pass through a threaded opening 66 in the carriage 65 and frictionally engage the top surface of the bottom wall 61A of the channel 61 so as to lock both the carriage 65 and the lower end of the threaded bolt itself in place. The other is to have its upper end serve as a means of attachment for the heavy load, i.e., a particular leg of the frame 17 that supports the dish 10.

METHOD OF INSTALLATION

The method of retrofitting the tile-covered roof structure to support the satellite dish or other heavy load is carried out as follows. Turning to FIG. 5, a particular tile member such as the selected tile member 42 which has a portion thereof elevated above the roof plate is chosen for removal. A chalk line 45, is made upon the top surface of several of the tiles, including tile 42, and this chalk line marks the location where channel member 61 will later extend horizontally in a direction perpendicular to the rafters. Then the tile 42 is removed, and opening (shown as 44 in FIG. 10) is formed in it. Alternatively, the opening 44 may be formed at a later time (as shown in FIG. 10). When the tile member 42 is later replaced, the position of opening 44 will establish the location where threaded bolt 70 must be downwardly inserted to engage the carriage 65.

Preferably the next step is then to drill a small hole 36 through the roof plate 34 and into the selected rafter 32 as shown in FIG. 6. Next, as shown in FIG. 4, the generally Z-shaped metal frame 50 is selected, which has a lower end portion 55 (the lag bolt) adapted to extend downward through the hole in 36 the roof plate, a mid-portion 60 (channel member 61 and carriage 65) adapted to rest horizontally upon the roof plate, and an upper end portion (the threaded bolt 70) adapted to pass vertically upward through the opening in the selected tile member. The channel member 61 is placed upon the roof plate such that it extends horizontally in a direction perpendicular to the rafters, underneath the chalk line 45. Turning to FIG. 4, sealing material (not shown) is placed over the drilled hole 36 in the roof plate so that there will be no leakage after the lag bolt is inserted. The lag bolt 55 is then inserted through hole 63 in the channel member, through the drilled hole 36 in the roof plate, and is driven downward so as to secure the channel member 61 not only to the roof plate, but also to the underlying rafter 32.

Next, the carriage 65, if not already there, is placed upon the channel member 61. The carriage is moved to a location that is approximately beneath the position that opening 44 will occupy when tile 42 is replaced. This will provide an adjustment of the horizontal distance between the lag bolt 55 and the threaded opening 66 in the carriage 65. If opening 44 has not previously been formed in the removed tile 42, that is done now. The removed tile 42 is then replaced. Opening 44 is then approximately above the carriage 65.

It should be noted that, generally speaking, the worker on the roof will not find it at all convenient, or perhaps even possible, to make such measurements with precision. It should also be noted that the threaded bolt 70 cannot be attached to carriage 65 before replacing tile 42, because there is insufficient space to do that.

Figure 11:
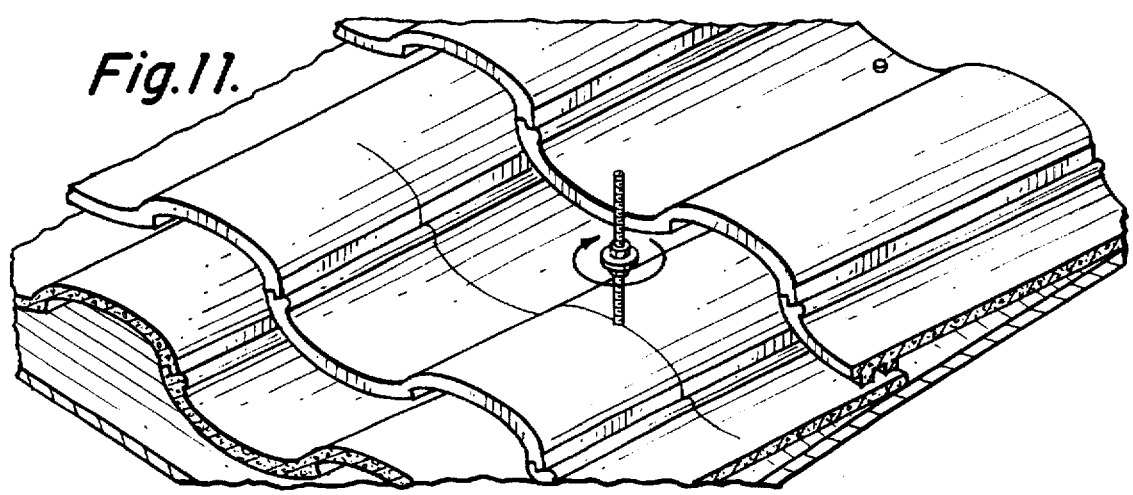
Figure 12:
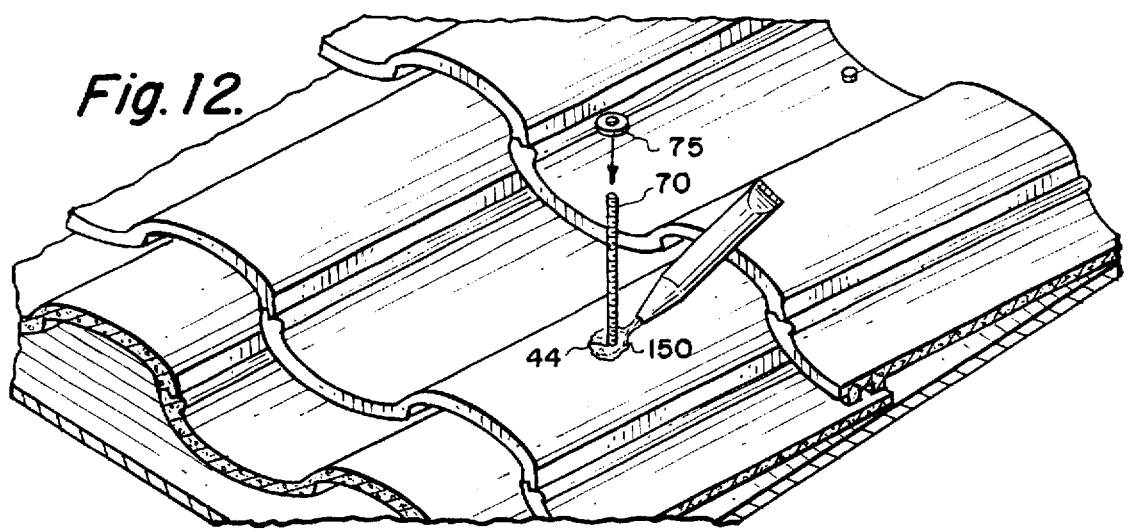
Figure 13:
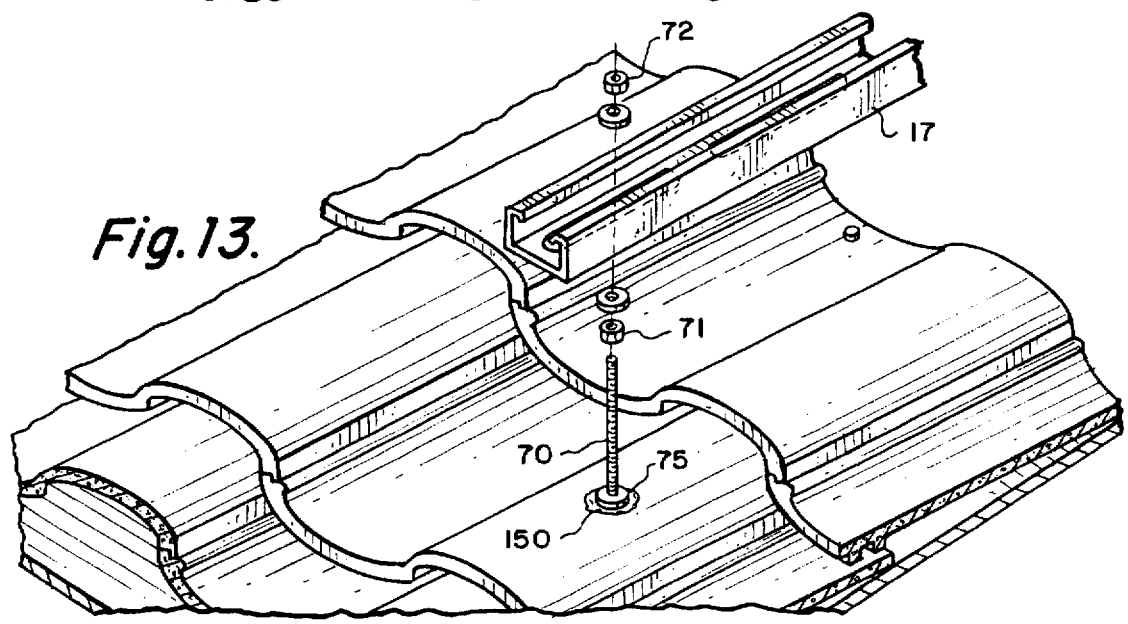
Figure 14:
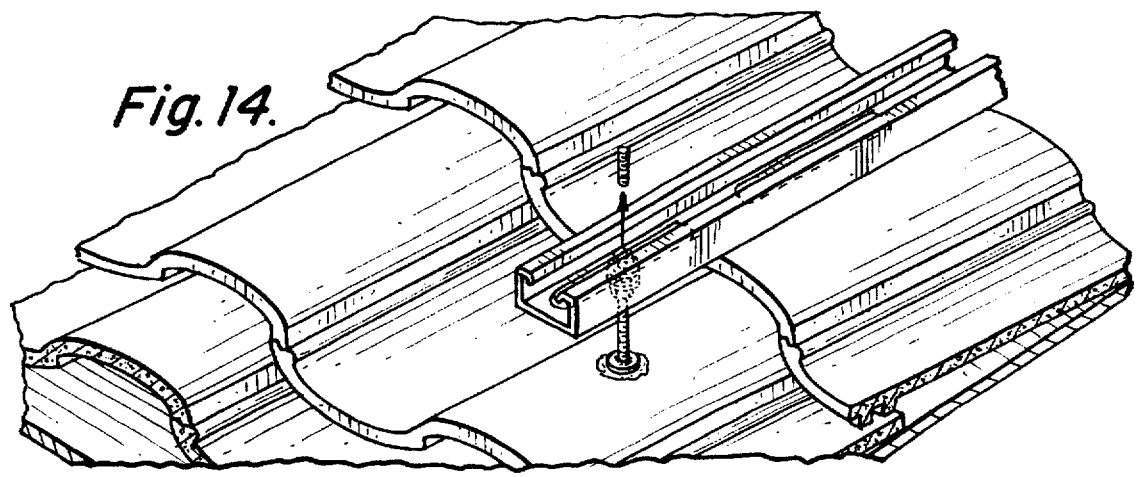
Figure 15:
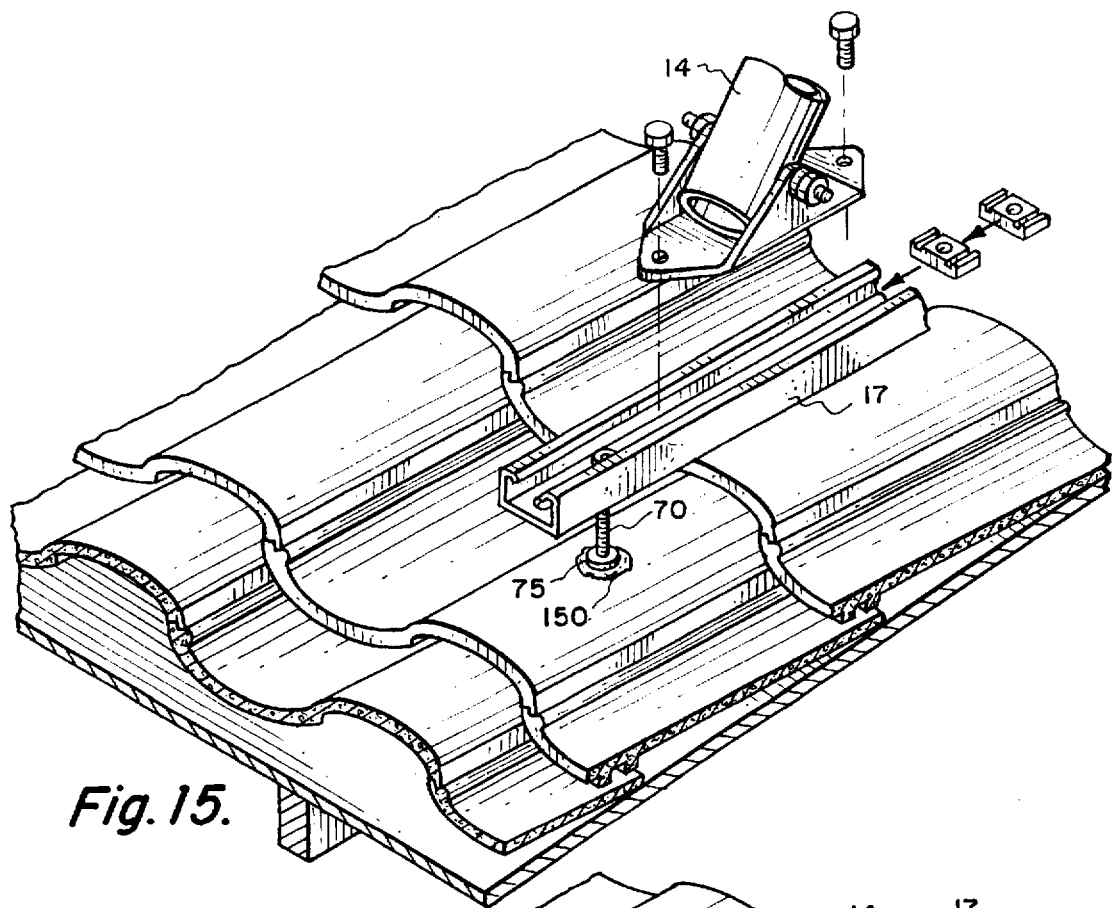
Figure 16:
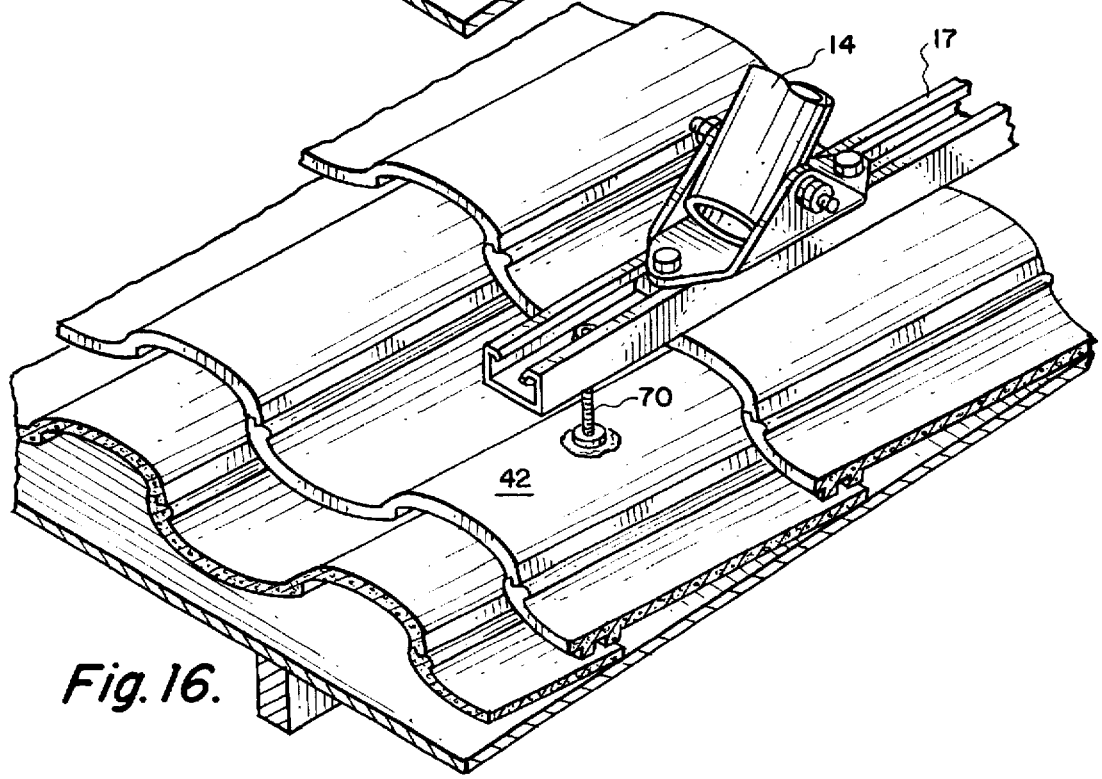

Next, turning to FIG. 10, the two nuts 71, 72 on the upper end of threaded bolt 70 are tightened against each other. The lower end of bolt 70 is inserted downward through the opening 44 to engage the threaded opening 66 in the carriage 65. After initial engagement, the bolt is manipulated slightly so as to slide the carriage to an exactly correct position, as nearly as possible. The upper one of the nuts is then turned to drive the lower end of bolt 70 into biting engagement with the upper surface of the channel member 61 as dipicted in FIG. 11. At this time sealing material 150 is placed about the upper part of bolt 70 so as to completely seal the opening 44 in the tile as shown in FIG. 12. The washer 75 is slid down along the bolt 70 to engage the sealing material and hold it in place. As shown in FIG. 13, the washer 75 is then held in place by the sealing material 150.

Then a channel member that forms part of the T-shaped base of frame 17, which has a suitable opening in it, is placed over the bolt 70 and is supported by nut 71 after nut 71 has been screwed part way onto bolt 70. Then the upper nut 72 is tightened so as to secure the base of frame 17 in place.

When all four of the attachments are made in this manner, the dish 10 or other heavy load is supported from the roof, but not from any tile member.

ALTERNATE FORM OF APPARATUS

Figure 17:
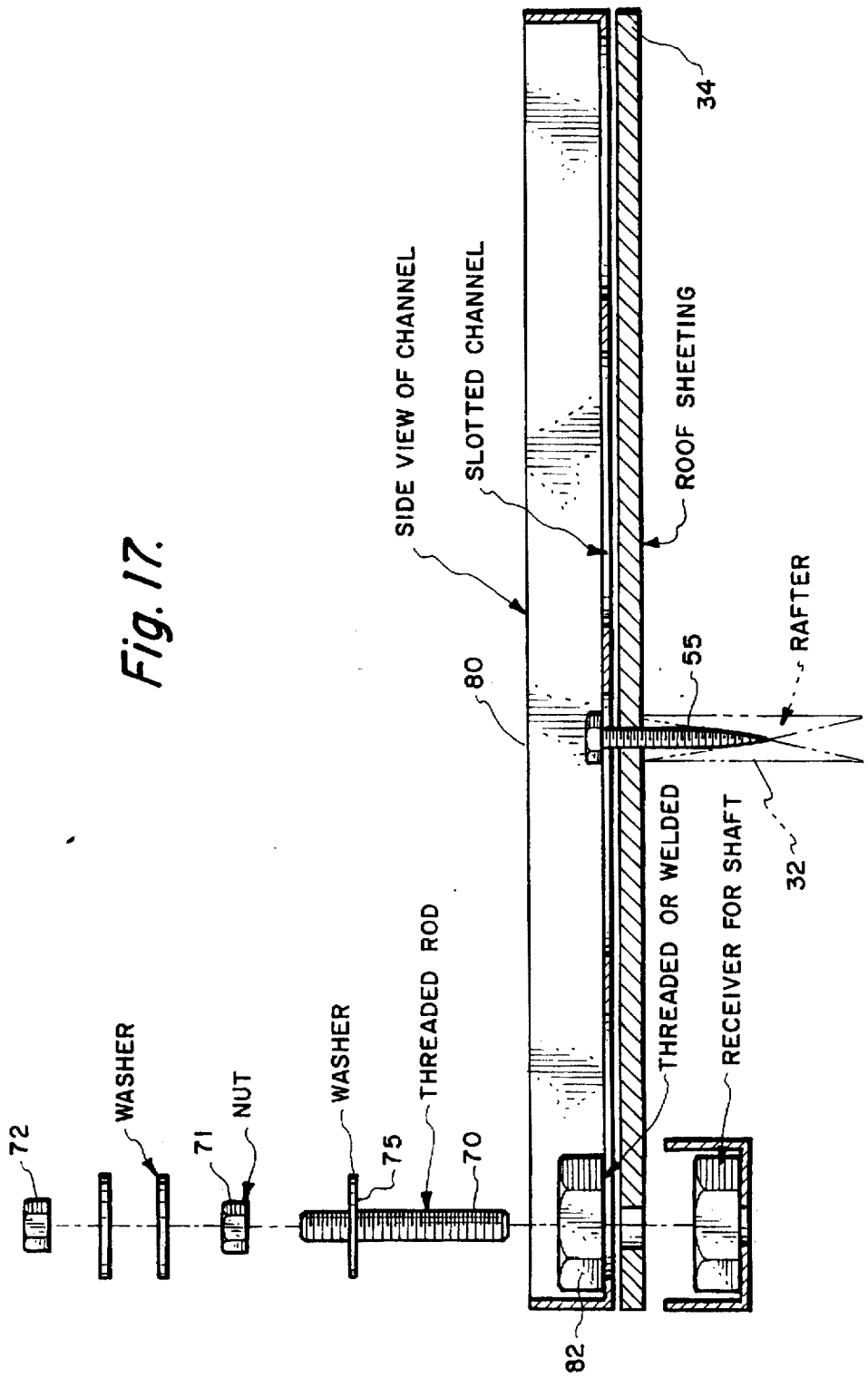
FIG. 17 shows a modified form of apparatus in accordance with the invention.

FIG. 17 shows an alternate form of the apparatus that is workable, although not preferred. The mid-portion of the metal frame is provided by a channel member 80 that has a plurality of elongated holes or slots in its bottom wall. The lag bolt may be installed into the roof plate 34 through any one of these slots, and the channel member 80 may then be slid longitudinally relative to the lag bolt 55. At the other end of the channel member 80 a nut 82 has been welded onto the top surface of its bottom wall. The threaded rod can be inserted down into the nut 82 and is then tightened against the upper surface of the bottom wall of the channel member. Before the threaded rod is tightened, the channel member may be slid longitudinally to provide a means to adjust the horizontal separation of the lag bolt and the threaded rod. On the upper extremity of the threaded bolt are the same two nuts 71, 72, used to attach the load above the tile, in the same manner as before. The difference in the installation process is that a measurement must be made to determine the correct position of the threaded bolt as it will appear under opening in the tile member; then the channel member must be secured to the roof plate in that position by positioning the lag bolt in the appropriate position in one of the elongated slots.

An advantage of the carriage 65 in my preferred embodiment is that it provides a quicker and easier means to establish the proper horizontal separation between the attachments of the lag bolt 55 and the threaded bolt 70 to the horizontal mid-portion of the metal frame as is best shown in FIG. 4.

While the presently preferred form of the invention has been disclosed in detail in order to comply with the patent laws, it will nevertheless be understood that the scope of the invention is to be determined only in accordance with the appended claims.

What I claim is:

1. A method of retrofitting a tile-covered roof structure that includes a plurality of rafters arranged generally in parallel at an angle inclined to the horizontal and a wooden roof plate supported upon the rafters, for supporting a heavy load but without damage to tile members, the method comprising the steps of:

selecting a tile member that has a portion thereof elevated above the roof plate, and removing the tile member;

forming an opening in the removed tile member;

selecting a generally Z-shaped metal structure having a lower end portion adapted to extend downward through the roof plate, a mid-portion adapted to rest horizontally upon the roof plate, and an upper end portion adapted to pass vertically upward through the opening in the selected tile member;

positioning the metal structure such that the mid-portion thereof extends horizontally in a direction perpendicular to the rafters and the lower end portion of the metal structure is secured to the roof plate;

placing a slidable carriage upon the horizontal mid-portion of the metal structure;

selecting a threaded shaft to act as the upper end portion of the metal structure;

replacing the removed tile member;

inserting the threaded shaft through the opening in the now replaced tile member and thence downward to engage the carriage;

adjusting the horizontal position of the carriage so as to adjust the horizontal distance between the threaded shaft and the lower end portion of the metal structure; and providing means on the upper end portion of the metal structure for securing the heavy load such that the metal structure is supported by the roof structure, but not by the replaced tile member.

2. The method of claim 1 which includes the further step of placing sealing means around the upper end portion of the metal structure where the metal structure passes through the opening in the tile member.

3. The method of claim 1 which includes drilling a hole through the roof plate into a selected rafter, selecting a threaded lag bolt to act as the lower end portion of the metal structure, and inserting the lag bolt through the mid-portion of the metal structure and thence downward through the hole in the roof plate and into the selected rafter.

4. A tile-covered roof structure for supporting a heavy load without damage to the tile members, comprising:

a plurality of rafters arranged generally in parallel and inclined at an angle to the horizontal;

a roof plate supported upon the rafters;

a tile member having a portion thereof normally elevated above the roof plate;

a generally Z-shaped metal structure having a lower end that extends downward through the roof plate into one of the rafters, the Z-shaped structure having a mid-portion that extends horizontally in a direction perpendicular to the rafters and rests upon the roof plate;

the Z-shaped structure having an upper end portion that passes vertically upward through an opening in the elevated portion of the tile member; and securing means on the upper end portion of the metal structure for securing the heavy load such that the heavy load is supported by the roof plate and the rafter, but not by the tile member;

the mid-portion of the metal structure having a channel-shaped member, the channel-shaped member having a bottom wall with a hole therethrough, the hole being offset from the longitudinal center of the bottom wall;

the lower end of the metal structure being comprised of a lag bolt which extends through the hole in the bottom wall of the channel-shaped member;

a carriage slidably supported upon the channel-shaped member for adjusting the lateral position of the carriage with respect to the rafters; and the upper end portion of the metal structure includes a threaded bolt having a lower end for securing the carriage relative to the channel-shaped member.

5. The roof structure of claim 4 that also includes sealing means surrounding the upper end portion of the metal structure that passes through the opening in the tile member.

6. A roof structure as in claim 4 wherein a pair of nuts are received on the upper extremity of the threaded bolt of the upper end portion, the pair of nuts being capable of engaging one another on the threaded bolt so as to provide a means for rotatably driving the bolt downward upon the mid-portion of the metal structure.

7. A metal structure for placement upon a tile-covered roof underneath a particular tile member so as to support a heavy load above the tile member but without damage to the tile member, comprising:

a generally Z-shaped frame having a mid-portion adapted to extend horizontally upon the roof, a lower end portion adapted to extend downward through the roof into a supporting rafter, and an upper end portion adapted to pass vertically upward through an opening in the tile member;

the mid-portion of the frame having means for securing the lower end portion thereto, and also having separate means for securing the upper end portion thereto, at least one of the securing means being adjustable lengthwise of the mid-portion of the frame so as to vary the horizontal distance between the lower end portion and the upper end portion;

the lower end portion of the frame having means for securing within a rafter against vertical movement either up or down;

the upper end portion of the frame having means on an upper extremity for supporting the load against vertical movement either up or down; and the securing means for the upper end portion of the frame being slidably adjustable relative to the mid-portion of the frame.

8. A metal structure as in claim 7 wherein the mid-portion of the frame is a channel-shaped member having lateral edges with outwardly extending flanges.

9. A metal structure as in claim 8 wherein the means for securing the upper end portion of the frame to the mid-portion includes a carriage slidably supported upon the channel-shaped member, the carriage having downwardly extending fingers that grip the undersides of the flanges so as to support the load against upward vertical movement.

10. A metal structure as in claim 9 wherein the upper end portion of the metal structure also includes a threaded bolt whose lower end secures the carriage in an adjusted position relative to the channel-shaped member.

11. A metal structure as in claim 10 wherein the means on the upper extremity of the threaded bolt for supporting the load against vertical movement either up or down comprises a pair of nuts.

12. A metal structure as in claim 7 wherein the mid-portion of the frame has a hole therein for securing the lower end portion of the frame, and the means for securing the lower end portion within a rafter includes a lag bolt adapted to extend through the hole and into the rafter for securing the frame against vertical movement either up or down.

13. An apparatus for supporting a heavy load above a tile roof without damage to tile members, comprising:

an elongated base member adapted to lie upon the surface of the roof underneath a tile member and having upper and lower surfaces;

a lag bolt having a head end, and a threaded body;

a hole in the base member providing a first attachment means such that the threaded body of the lag bolt may be inserted therethrough for passing downward into the roof to secure the base member thereon;

a nut supported above the upper surface of the base member and firmly secured against vertical movement relative to the base member, the nut having a threaded hole therein providing a second attachment means;

an elongated shaft having a lower end which is threaded and adapted to be inserted downwardly through an opening in the tile member so as to then engage the threaded hole of the nut;

the elongated shaft being adapted for rotation to tighten the elongated shaft so that the lower end may extend through the nut and bite into the lower surface of the base member, thus firmly supporting the elongated shaft; and the elongated shaft having an upper end adapted to protrude above the tile member so that the heavy load may be attached to the upper end of the elongated shaft.

14. Apparatus as in claim 13 which includes means for adjusting the horizontal separation of the two attachment means before tightening the elongated shaft.

15. Apparatus as in claim 13 wherein the nut rests directly upon the upper surface of the base member, is fixedly attached thereto, and the hole in the base member is elongated for adjusting the position of the base member longitudinally relative to the lag bolt.

16. Apparatus as in claim 13 which further includes track means formed on the base member, and a carriage having interlocking track means; and wherein the nut is formed as part of the carriage, the carriage is slidable lengthwise of the base member for adjusting the horizontal separation of the two attachment means, and the tightening of the elongated shaft fixes the horizontal separation of the two attachment means.

17. A method for installing an apparatus for supporting a heavy load above a tile covered roof:
   a) selecting a elongated base member having a bottom wall;
   b) securing the base member to a roof;
   c) selecting a carriage having a threaded hole therethrough;
   d) coupling the carriage to the base member so that the carriage is retained by the base member and unable to be plucked from the base member but is able to slide at least part of the length of the base member;
   e) drilling a hole in a tile;
   f) placing the tile on the roof so that the tile covers the roof, the base member, and the carriage;
   g) positioning the carriage so that the threaded hole in the carriage is generally coaxially aligned with the hole in the tile;
   h) inserting an elongated threaded shaft into threaded engagement with the hole in the carriage;
   i) rotating the elongated shaft until the end of the shaft engages the bottom wall of the base member thereby securing the shaft from movement with respect to the base member.

18. The method of claim 17 further comprising the steps of:
   a) screwing a first threaded nut onto the shaft;
   b) screwing a second threaded nut onto the shaft until it contacts the first threaded nut; and
   c) turning the second threaded nut so as to rotate the shaft thereby securing the carriage from movement with respect to the base member.

19. The method of claim 18 further comprising the steps of:
   a) removing the second nut from the shaft;
   b) positioning the first nut in a desired position on the shaft above the tile; and
   c) coupling a heavy load to the shaft so that the structure is supported by the first nut and does not come in contact with the tile.

20. The method of claim 19 wherein the base member is secured to the roof by screwing a lag bolt through a hole in the base member and into a rafter in the roof.

21. The method of claim 18 wherein the step of rotating the shaft causes outwardly extending flanges on the base member to securely engage flanges on the carriage that pass underneath the flanges of the base member, thereby securing the carriage from movement with respect to the base member.

22. The method of claim 17 wherein the base member is selected so that when the apparatus for supporting a heavy load comprises more than one base member, each of the base members may be secured to a rafter in the roof using a lag bolt.

23. The method of claim 17 wherein the step of coupling the the carriage to the base member causes the carriage to be fixedly attached to the base member and unable to slide the length of the base member thereby providing a threaded attachment means fixedly coupled to the base member, and wherein the base member further comprises slots in the bottom wall so that the step of positioning the carriage must be performed by adjusting the base member with respect to the roof prior to the step of securing the base member to the roof, and wherein the threaded attachement means must be positioned so that after the tile has been secured to the roof, the hole in the tile will be precisely coaxially aligned with the threaded attachement means.

24. An apparatus for supporting a satellite dish above a tile roof without causing damage to tile members, comprising:
   a) a tile member having a hole therethrough;
   b) an elongated base member adapted to lie upon the surface of a roof underneath the tile member;
   c) a lag bolt for securing the the base member to the roof;
   d) a slidable carriage having a threaded hole therethrough, the carriage slidably engaging the base member and being capable of sliding at least part of the length of the base member so as to provide adjustment of the position of the carriage with respect to the hole in the tile member;
   e) an elongated shaft capable of being inserted through the hole in the tile member;
   f) the elongated shaft being capable of threadingly engaging the carriage so that rotation of the shaft causes the end of the shaft to bite into the surface of the base member so as to fixedly secure the shaft;
   g) the elongated shaft having means for coupling to a satellite dish supporting structure;
   h) a satellite dish having a supporting structure, the structure being coupled to the elongated shaft by the coupling means so that the dish and the structure are able to be supported away from the tile member to prevent damage to the tile member.

25. The apparatus of claim 1 futher comprising two nuts which contact one another on the shaft so as to provide a means for rotating the elongated shaft and which provide the means to couple the satellite dish supporting structure to the elongated shaft.

* * * * *